US005272643A

United States Patent [19]

Tokai

[11] Patent Number: 5,272,643

[45] Date of Patent: Dec. 21, 1993

[54] PRESS BRAKE WITH CROWN ADJUSTMENT AND MOVABLE TABLE ADJUSTMENT CALCULATE FROM FIRST AND SECOND DIE CONTIGUOUS POSITION

[75] Inventor: Shigeru Tokai, Komatsu, Japan

[73] Assignee: Kabushiki Kaisha Komatsu Seisakusho, Tokyo, Japan

[21] Appl. No.: 674,349

[22] PCT Filed: Aug. 30, 1990

[86] PCT No.: PCT/JP90/01105

§ 371 Date: Apr. 29, 1991

§ 102(e) Date: Apr. 29, 1991

[87] PCT Pub. No.: WO91/03333

PCT Pub. Date: Mar. 21, 1991

[30] Foreign Application Priority Data

Aug. 31, 1989 [JP] Japan .................................. 1-225662

[51] Int. Cl.[5] ........................ G06F 15/46; B21D 5/02; B30B 15/18

[52] U.S. Cl. ..................................... 364/476; 72/380; 72/389

[58] Field of Search ........................... 364/474.07, 476; 72/389, 380, 448

[56] References Cited

U.S. PATENT DOCUMENTS 4,620,435 11/1986 Gabella et al. ........................ 72/389

FOREIGN PATENT DOCUMENTS 2495505 12/1981 France .

62-267018 11/1987 Japan ..................................... 72/389

2188266 3/1987 United Kingdom .

*Primary Examiner*—Jerry Smith

*Assistant Examiner*—Paul Gordon

*Attorney, Agent, or Firm*—Diller, Ramik & Wight

[57] ABSTRACT

An apparatus for controlling a press brake is advantageously employable for a press brake for which a high operational efficiency and a high working accuracy are required. In response to inputting of working conditions inclusive of a target bending angle for a plate, the apparatus calculates displacement of a load active on a stationary table and a movable table, automatically calculates a quantity of crowning to be adjusted based on results derived from the foregoing calculation and then calculates the present position assumed by the movable in additional consideration of the quantity of crowning to be adjusted, based on results derived from the aforementioned calculations. The press brake accurately bends the plate based on the thus derived quantity of crowing to be adjusted and the present position assumed by the movable table without an occurrence of malfunction of so-called intermediate opening of the bent plate.

2 Claims, 4 Drawing Sheets

PRESS BRAKE WITH CROWN ADJUSTMENT AND MOVABLE TABLE ADJUSTMENT CALCULATE FROM FIRST AND SECOND DIE CONTIGUOUS POSITION

TECHNICAL FIELD

The present invention relates generally to an apparatus for controlling a press brake. More particularly, the present invention relates to an apparatus for controlling a press brake wherein a plate is bent to a required bend angle with a high accuracy in additional consideration of mechanical deformation of the press brake caused by a bending operation performed for the plate.

BACKGROUND ART

As shown in FIG. 6 and FIG. 7, a press brake c includes a lower beam e on which a die a having a V-shaped sectional contour is fixedly mounted and an upper beam d on which a punch b is fixedly mounted so that a plate f is bent by lowering the upper beam d. As the plate is bent in this way, the upper beam d is deflected upwardly and the lower beam e is deflected downwardly during the bending operation under the influence of a load exerted on the upper beam d and the lower beam e, as represented by one-dot chain lines in FIG. 7. As a result, there is caused a phenomenon of so-called intermediate opening that a bend angle $\theta_2$ of the plate f becomes larger than a bend angle $\theta_1$ at opposite ends of the plate f because of the aforementioned deflection (refer to FIG. 8).

To prevent the phenomenon of intermediate opening from being caused, a measure of crowning adjustment is taken such that the central part of the die as viewed in the longitudinal direction is previously bent upwardly as represented by a two-dot chain line in FIG. 7 to maintain a parallel relationship between the upper beam d and the lower beam during the bending operation. Such a crowning adjustment mechanism as mentioned above has been already known as an apparatus for eliminating a malfunction of so-called intermediate opening in a press brake wherein the apparatus is disclosed in an official gazette of Japanese Patent Publication NO. 47017/1985 of which patent application was filed by the common applicant to the present invention.

When the plate f is to be bent to a required bend angle by operating the press brake c, it is required that a so-called quantity of driving g, i.e., a distance between the upper end of the die a and the lower end of the punch b is correctly determined corresponding to the required bend angle. In view of the fact that the driving quantity g is definitely determined by presetting the lowermost position of the punch b, the press brake is equipped with a mechanism for adjusting a quantity of downward stroke of the upper beam d so that the downward stroke quantity of the upper beam d is set to an optimum value corresponding to the required bend angle with the aid of the foregoing adjusting mechanism. This kind of technology has been already known as an apparatus for controlling a bend angle in a press brake wherein the apparatus is disclosed in an official gazette of Japanese Patent Publication NO. 20927/1989.

According to the foregoing prior invention, working conditions associated with a required bend angle of a plate, a thickness of the plate and others are inputted into the apparatus so that a value of correction to be accomplished for the driving quantity is obtained based on the working conditions in additional consideration of mechanical characteristics of the press brake and elastic deformation characteristics of the plate and the corrected driving quantity is then obtained based on the corrected value of the driving quantity and the logical value derived from the driving quantity, whereby the lowermost position to be assumed by the punch is set corresponding to the corrected driving quantity.

With respect to the first-mentioned prior invention relating to a mechanism for adjusting a quantity of crowning, however, it has been found that the mechanism has the following drawback. Specifically, a quantity of crowning to be adjusted varies in correspondence to a quantity of deflection of each of the upper beam d and the lower beam e. In view of the fact that the deflection quantity varies depending on the working conditions associated with a bending operation, an operator usually performs trial bending operations by several times at every time when the working conditions vary, in order to determine a quantity of crowning to be adjusted for eliminating the malfunction of intermediate opening. After he performs an adjusting operation with reference to the thus determined quantity of crowning to be adjusted, he starts normal operations for successively bending a number of plates. However, the determination of the crowning adjustment quantity made on the basis of a try-and-error process imposes a requirement for high skillfulness on him. Other drawback is that a dimensional accuracy fluctuates from product to product depending on a degree of skilfullness owned by each operator. In addition, there is a possibility that the malfunction of intermediate fails to be eliminated. Another drawback is that an operational efficiency is substantially reduced by an extent equivalent to a period of time consumed for the trial bending operations.

On the other hand, with respect to the last-mentioned prior invention relating to an apparatus for controlling a bend angle associated with a bending operation to be performed by a press brake, the apparatus has an advantage that a required bend angle can automatically be obtained without any necessity for trial bending operations, since the lowermost position to be assumed by the punch is determined with the apparatus in additional consideration of mechanical characteristics of the press brake and elastic deformation characteristics of the plate. According to this prior invention, however, it has been found that the apparatus has a drawback that the bend angle practically obtained after completion of the operation for adjusting the crowning quantity deviates from the required bend angle, because variation of the bend angle caused by the operation performed for adjusting the crowning quantity is not taken into account.

DISCLOSURE OF THE INVENTION

The present invention has been made with the foregoing background in mind and its object resides in providing an apparatus for controlling a press brake wherein the apparatus performs an operation for adjusting a quantity of crowning and an operation for locating a position to be assumed by a movable table, i.e., an upper beam of the press brake in order that the press brake can bend a plate to a required bend angle with a high accuracy while the apparatus automatically eliminates a malfunction of so-called intermediate opening of the bent plate without any necessity for trial bending operations.

To accomplish the above object, there is provided according one aspect of the present invention an apparatus for controlling a press brake including a stationary table on which a first die is fixedly mounted and a movable table on which a second die is fixedly mounted for bending a plate by displacing the second die to approach the first die, the second die being vertically displaced to come in contact and out of contact with the first die, a quantity of crowning of the stationary table or the movable table being properly adjusted so as to allow a bend angle of the plate to reach a target bend angle while the position assumed by displacement of the movable table is adequately adjusted when the first die and the second die approach closest to each other, wherein the apparatus comprises first calculating means for calculating displacement of a load exerted on the stationary table and the movable table based on a plurality of working conditions for bending the plate inclusive of the target bend angle when the first die and the second die approach closest to each other, second calculating means for calculating the quantity of crowning to be adjusted based on results derived from the calculation performed by the first calculating means, and third calculating means for calculating a position assumed by the movable table based on results derived from the calculation performed by the first calculation means and the calculation performed by the second calculating means when the first die and the second die approach closest to each other, so as to allow the bend angle of the plate to reach the target bend angle, whereby the stationary table or the movable table is adjusted in respect of the quantity of crowning based on results derived from the calculation performed by the second calculating means, and the position assumed by the movable table when the first die and the second die approach closest to each other is adjusted based on results derived from the calculation performed by the third calculating means.

With the apparatus of the present invention as constructed in the above-described manner, the first calculating means calculates displacement of the load active at respective parts on the stationary table and the movable table as a bending operation is performed based on the working conditions. The second calculation means calculates an optimum quantity of crowning to be adjusted depending on the calculated displacement of the load. Additionally, the third calculating means calculates the position where the movable tables is displaced to bend the plate to the target bend angle, in additional consideration of the calculated displacement of the load and the extent of variation of the crowning adjustment quantity. Thus, the apparatus carries out crowning adjustment depending on the crowning adjustment quantity derived by the second calculating means and then determines the position to be assumed by the movable table so as to allow the present position assumed by the movable calculating means. As a result, the apparatus simultaneously automatically adjusts the present crowning quantity to an optimum quantity in additional consideration of the displacement of the load and determines the present position assumed by the movable table to an optimum position in additional consideration of the displacement of the load and the extent of variation caused by the crowning adjustment quantity.

Further, according to other aspect of the present invention, there is provided an apparatus for controlling a press brake including a stationary table on which a first die is fixedly mounted and a movable table on which a second die is fixedly mounted for bending a plate by displacing the second die to approach the first die, the second die being vertically displaced to come in contact and out of contact with the first die, a quantity of crowning of the stationary table or the movable table being properly adjusted so as to allow a bend angle of the plate to reach a target bend angle while the position assumed by displacement of the movable table is adequately adjusted when the first die and the second die approach closest to each other, wherein the apparatus comprises inputting means for allowing a plurality of working conditions inclusive of the target bend angle to be inputted into the apparatus, load displacement calculating means for calculating displacement of a load active at respective parts on the stationary table and the movable table inclusive of a quantity of deflection of each of the stationary table and the movable table when the first die and the second die approach closest to each other, based on the bending condition inputted by the inputting means, crowning adjustment quantity calculating means for calculating the quantity of crowning to be adjusted based on the quantity of deflection of each of the stationary table and the movable table, crowning adjusting means for adjusting the stationary table and the movable table in respect of the state of crowning thereof based on results derived from the calculation performed by the crowning adjustment quantity calculating means, and table displacement position adjusting means for deriving a quantity of driving of the first die and the second die based on the bending condition inputted by the inputting means and then adjusting the position assumed by the movable table when the first die and the second die approach closest to each other, based on the driving quantity and results derived from the calculation performed by the load displacement calculating means and the calculation performed by the crowning adjustment quantity calculating means.

Other objects, features and advantages of the present invention will become readily apparent from reading of the following description which has been made in conjunction of the accompanying drawings.

BRIEF DESCRIPTION OF THE DRAWINGS

FIG. 6 to FIG. 8 are an illustrative view which schematically shows the prior art, respectively; wherein FIG. 6 is a side view showing an essential part of a press brake while a plate is being bent;

FIG. 7 is a front view of a press brake; and

FIG. 8 is a perspective view of a product which is produced by a bending operation.

BEST MODE FOR CARRYING OUT THE INVENTION

Now, the present invention will be described in detail hereinafter with reference to the accompanying drawings which illustrate a preferred embodiment thereof.

Figure 1:
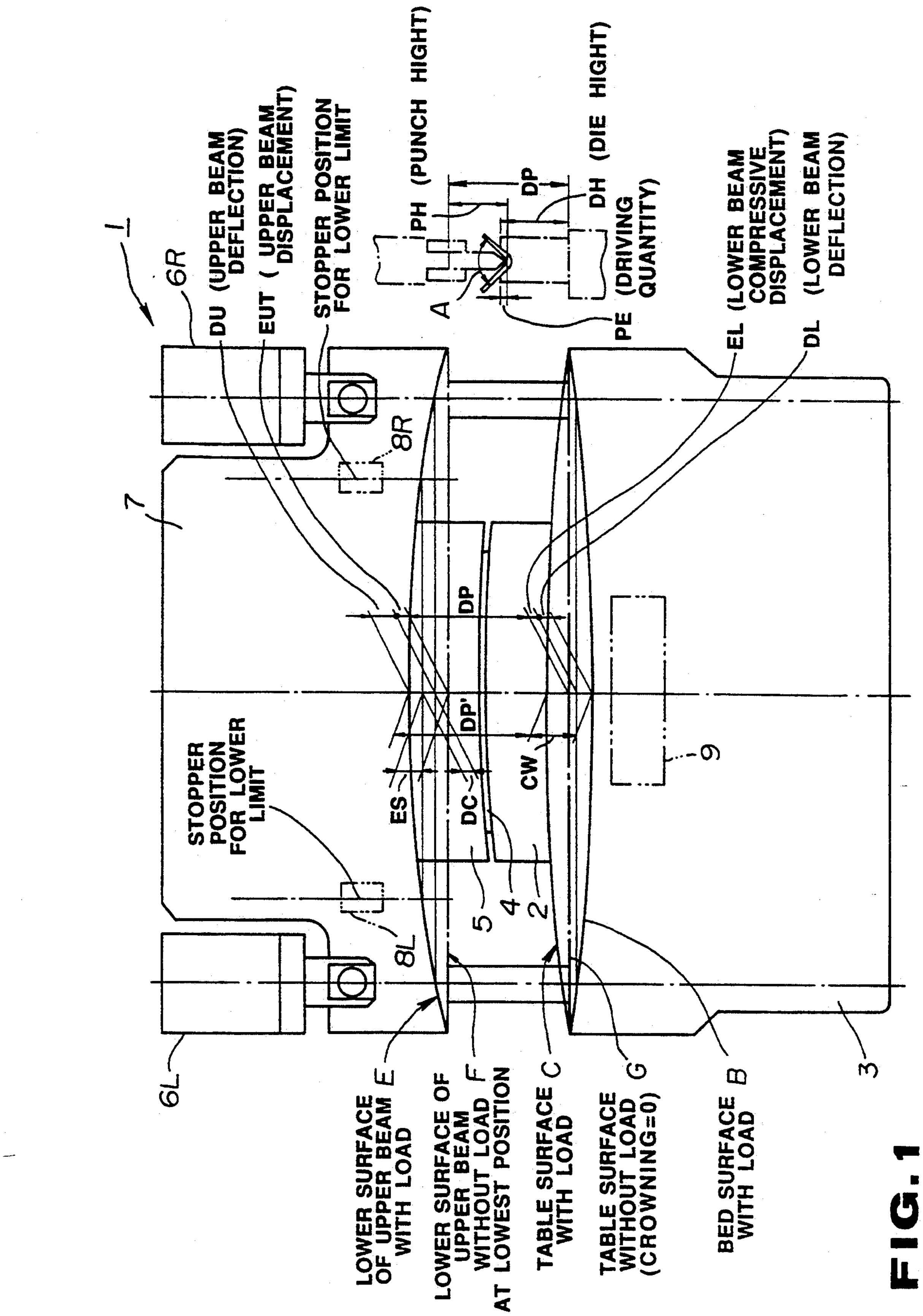
FIG. 1 is a front view of a press brake to which the present invention is applied.

FIG. 1 is a front view of a press brake 1 to which the present invention is applied.

As is apparent from the drawing, the press brake 1 is designed and constructed in large dimensions and includes a lower beam 3 serving as a stationary table on which a die 2 having a V-shaped contour as viewed from the side is fixedly mounted and an upper beam 7 serving as a movable table to vertically displace a punch 5 by actuating an opposing pair of hydraulic cylinders 6R and 6L. The punch 5 is fixedly secured to the lower end of the upper beam 7 so that a plate 4 is bent as the punch 5 lowers toward a V-shaped recess of the die 2.

FIG. 1 shows an operative state wherein the upper beam 7 lowers to the lowermost position, i.e., an operative state wherein the punch 5 approach nearest to the die 2. In practice, a bend angle A of the plate 4 schematically shown on the right-hand side of the drawing is determined depending on the lowermost position of the upper beam 7. Determination of the lowermost position of the upper beam 7 is accomplished by actuating an opposing pair of servomechanisms 8R and 8L which are arranged at suitable positions on the upper beam 7. This kind of servo-mechanism is one of well-known technologies and a structure of the servo-mechanism is not concerned directly with the purport of the present invention. For the reason, detailed description of the servo-mechanisms each serving to set the lowermost position of the upper beam 7 will not be required.

Figure 7:
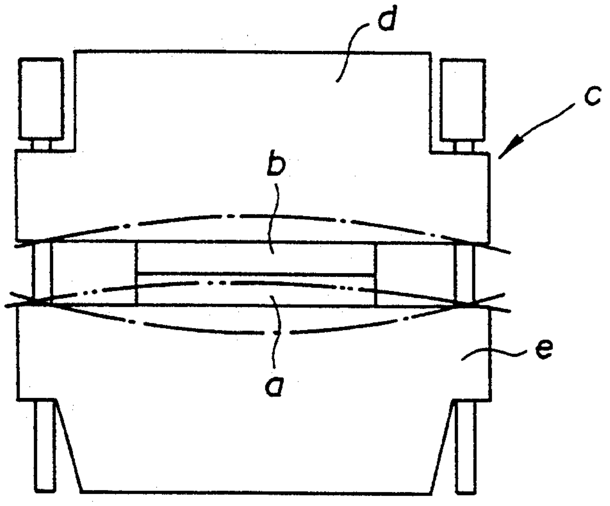
Figure 8:
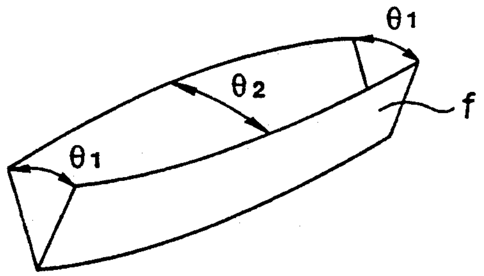

In addition, the press brake 1 is equipped with a crowning adjustment mechanism 9 which has been described above with reference to FIG. 7. The crowning adjustment mechanism 9 is intended to deform the upper surface of the lower beam 3 to a slightly arched contour as represented by an C mark in FIG. 1 to obtain a required quantity of crowning CW (as measured at the central part of the lower beam 3) in conformity with a crowning quantity setting command signal outputted from a CPU 10 (refer to FIG. 2) to be described later. Also this kind of the crowning adjustment mechanism is one of well-known technologies and a structure of the crowning adjustment mechanism is not concerned with the purport of the present invention. For the reason, detailed description of the crowing adjustment mechanism will not be required.

Figure 2:
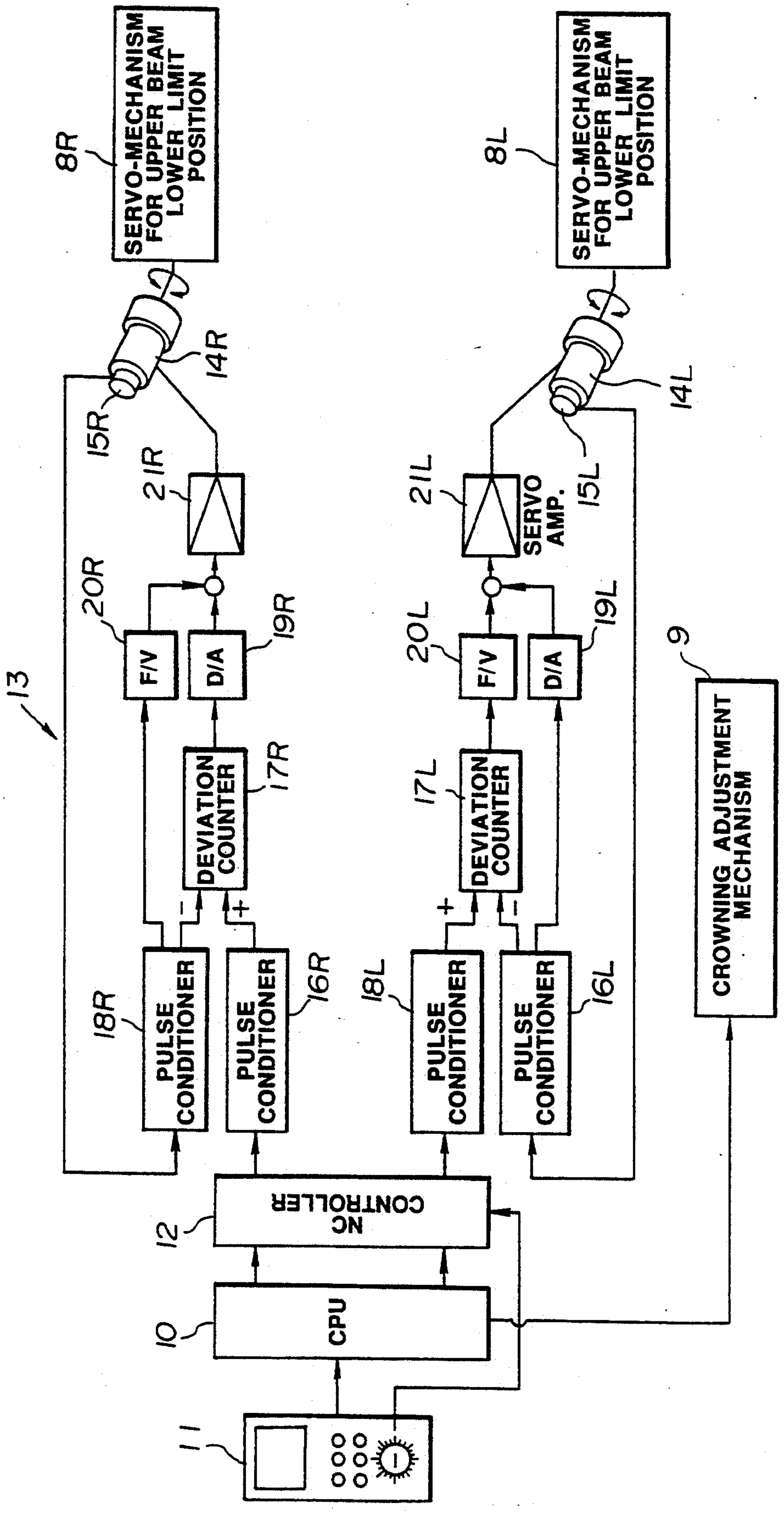
FIG. 2 is a block diagram which schematically illustrates by way of example a pair of servo-mechanisms each for locating the lowermost position of an upper beam and a crowning adjusting mechanism.

FIG. 2 is a block diagram which schematically illustrates a control unit for driving and controlling the servo-mechanisms 8R and 8L and the crowning adjustment mechanism 9.

As shown in FIG. 2, the control unit includes an operation panel 11 for performing operations for inputting and setting a plurality of working conditions for bending the plate 4 inclusive of a target bend angle WA to be described later and moreover determining start and stop of the operation of the press brake 1, a CPU 10 for calculating a crowning quantity CW with reference to the content of calculations to be described later based on the working conditions inputted into the operation panel 11, outputting to the crowning adjustment mechanism 9 a crowning quantity setting command for deforming the upper surface of the lower beam 3 by the calculated crowning quantity CW and calculating a target value of the lowermost position of the upper beam 3 to bend the plate 4 to the target bending angle WA, a NC controller 12 for outputting a pulse signal to a motor control section 13 to be described later corresponding to the target lowermost position calculated in the CPU 10, a motor control section 13 for carrying out feedback control for a pair of servo motors 14R and 14L in response to outputting from a pair of encoders 15R and 15L attached to the servo motors 14R and 14L such that the servo motors 14R and 14L are rotated by a quantity of rotation corresponding to the pulse signal outputted from the NC controller 12, and a pair of servo motors 14R and 14L for actuating the servomechanism 8R for setting the right-hand lowermost position of the upper beam 7 and actuating the servo-mechanism 8L for setting the left-hand lowermost position of the upper beam 7. The motor control section 13 carries out control for the servo motors 14R and 14L in the following manner. For the purpose of simplification, description will typically be made below only as to the servo motor 14R on the right-hand side of the press brake 1. Specifically, in response to a pulse signal (representative of a target value of a quantity of rotation of the servo motor 14R) outputted from the NC controller 12, the CPU 10 adds the pulse signal to a deviation counter 17R via a pulse conditioner 16R. Further, the CPU 10 adds a value derived from detection of the encoder 15R (present value representative of a quantity of rotation of the servo motor 14R) to the deviation counter 17R via a pulse conditioner 18R. The deviation counter 17R derives a quantity of deviation of the present value deviated from the target value of rotation of the servo motor 14R so as to allow the derived quantity of deviation to be outputted to a D/A converter 19R. The deviation of the quantity of rotation of the servo motor 14R from the target value is outputted from the D/A converter 19R in an analogue form. In addition, the CPU 10 adds an output from the pulse conditioner 18R to a F/V converter 20R so as to allow the present value representative of a motor speed (quantity of speed to be fed back) to be outputted from the F/V converter 20R in an analogue form. Further, the CPU 10 outputs a motor driving signal from a servo amplifier 21R corresponding to the deviation of the quantity of rotation of the servo motor 14R from the target value and the deviation of the present value of the motor rotational speed from the target value so that the servo motor 14R is rotated such that a quantity of rotation of the servo motor 14R reaches the target value in response to the motor driving signal.

Since the components 16L to 21L on the left-hand side have the same function as that of the components 16R to 21R on the right-hand side of the press brake 1, rotation of the servo motor 14L is controlled in the same manner as the servo motor 14R.

Figure 3:
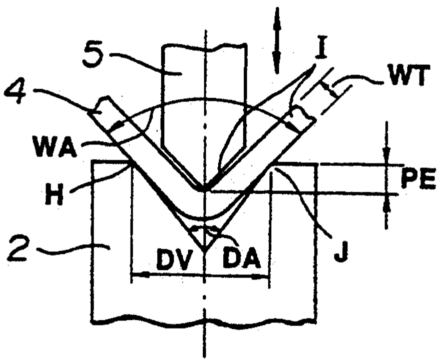
FIG. 3 is an illustrative view which schematically shows a geometrical relationship among a die, a plate and a punch shown in FIG. 1.

Next, arithmetic processing to be performed by the CPU 10 will be described below with reference to FIG. 1 and FIG. 3.

As is well known, to perform a bending operation for a plate that is called a V-shaped bend/air bend operation, the bend angle WA of a completed product (hereinafter referred to as a product bend angle) is defined by a positional relationship among a points H, I and J in FIG. 3. Among the three points H, J and I, the points H and J are determined by the die 2 and the punch 5 and the point I is determined by an ability of bending the plate 4 and the product bend angle WA. A distance between a line segment extending between the points H and J (representing the upper end of the die 2) and the point I (representing the foremost end of the punch 5) is hereinafter referred to as a quantity of driving PE). When the plate 4 is to be uniformly bent to a required bend angle WA, it is required that the driving quantity PE assumes an adequate value and the lowermost position of the upper beam 7 and the crowning quantity are properly controlled such that the driving quantity PE assumes a same value at any position as viewed in the longitudinal direction of the plate 4. It is hereinafter supposed that a thickness WT of the plate 4 does not fluctuate and a width DV of the V-shaped recess of the die 2 does not fluctuate in the longitudinal direction of the plate 4.

Factors for determining the driving quantity PE are roughly classified into two factors, one of them being a factor associated with an ability of bending the plate 4 and the other one being a mechanical factor associated with the press brake 1. The two factors will be described in more details in the following, 1) Factor associated with an ability of bending the plate Conditions associated with the die These conditions are concerned with dimensions as measured at respective parts of the die 2 and the punch 5. A width DV of the V-shaped recess of the die 2, a radius of the punch 5 at the foremost end of the latter and an angle DA of the V-shaped recess of the die 2 (refer to FIG. 4) are typically noted as die conditions.

Conditions associated with material

These conditions are concerned with characteristics of the plate 4. A material of the plate 4, a thickness WT of the plate 4, a value of T and a value of n are typically noted as material conditions.

Load during a bending operation

The bending load is associated with a factor of determining how far the foremost end of the punch 5 is driven in the plate 4. The product bend angle WA, the aforementioned die conditions and the aforementioned material conditions are typically noted as factors associated with the bending load.

Other conditions

A period of time of maintaining a compressed state and a bending speed are typically noted as other conditions associated with the foregoing factor.

2) Mechanical factor

Displacement of a load active on each of the upper beam and the lower beam

A quantity of deflection of each of the upper beam 7 and the lower beam 3, a quantity of deviation of positions assumed by stoppers for locating the servo-mechanisms 8R and 8L each setting the lowermost position of the upper beam and compressive deformation of each of the both beams 3 and 7 are typically noted as mechanical factors associated with the displacement of the load active on each of the upper and lower beams.

Degree of parallel extension of the upper beam and the lower beams

This factor is associated with the crowning quantity CW for correcting the displacement caused by the load active on the upper and lower beams.

Other factor

Displacement of a lower dead point caused by variation of a temperature and thermal deformation are noted as other factors.

In connection with the aforementioned factors, description will be first made as to a method of calculating the driving quantity PE in consideration of the factor associated with an ability of bending the plate.

Figure 4:
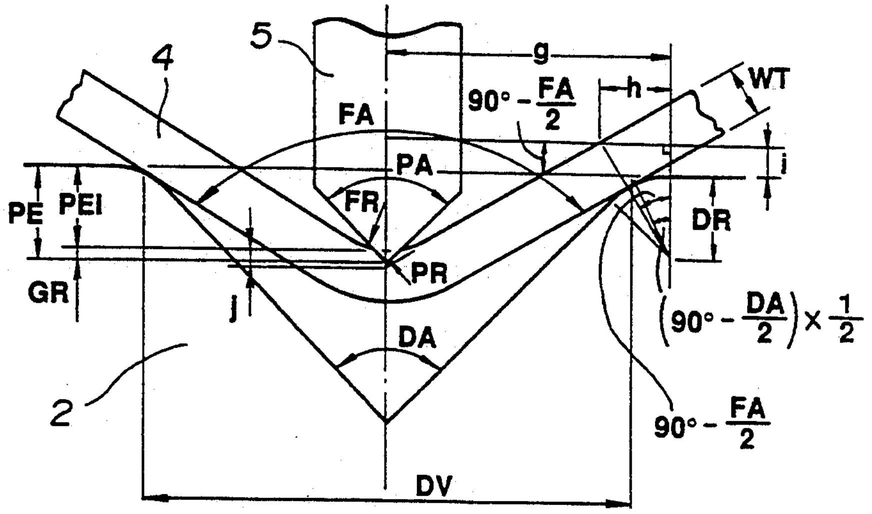
FIG. 4 is an illustrative view which schematically shows a geometrical relationship among the die, the plate and the punch during a so-called V-shaped bend/air bend operation.

FIG. 4 is an illustrative view which shows a geometrical relationship among the die 2, the punch 5 and the plate 4 during the V-shaped bend/air bend operation.

A plurality of conditions for bending the plate 4 as noted below are inputted into the operation panel 11. That is;

thickness WT of the plate, material MAT of the plate, angle WA for bending the plate to a product, spring-back angle SB, bending radius FR on the inside of the plate during the bending operation, radius PR of the punch at the foremost end of the latter, width DV of the V-shaped recess on the die, angle DA of the V-shaped recess on the die, radius DR of the die at a shoulder . . . (1)

(Incidentally, other conditions associated with the bending operation are inputted into the operation panel 11 and they will be described later.)

Now, a quantity of depth in the bent part of the plate, i.e., a quantity of driving GR of the foremost end of the punch into the bent part of the plate is definitely obtained in accordance with the following equation depending on the thickness WT of the plate, the material MAT of the plate, the angle WA for bending the plate to a product, the radius PR of the punch at the foremost end of the latter and the width DV of the V-shaped recess on the die.

$$GR=f(WT, MAT, WA, PR, DV) \quad (2)$$

It should be noted that it is assumed that the foregoing function f( ) is previously determined by way of experiments and simulations.

As is apparent from FIG. 4, the bend angle FA during the bending operation for the plate is expressed by the following equation.

$$FA=WA-SB \quad (3)$$

In the drawing, PEI is represented by the following equation.

$$PEI=(g-h)\times\tan(90^\circ-FA/2)-i-j \quad (4)$$

where the following four equations are established for g, h, i and j, wherein g is derived from the following equation, $$g=DV/2+DR\times\tan(90^\circ-DA/2)/2 \quad (5)$$

h is derived from the following equation, $$h=(DR+WT)\times\sin(90\surd-FA/2) \quad (6)$$

i is derived from the following equation and $$i=(DR+WT)\times\cos(90^\circ-FA/2)-DR \quad (7)$$

j is derived from the following equation.

$$j=FR\times(1/\cos(90^\circ-FA/2)-1) \quad (8)$$

Thus, PEI is obtainable by putting the equations (5) to (8) in the equation (4). Consequently, the driving quantity PE is expressed by the following equation.

$$PE=PEI+GR \quad (9)$$

Therefore, the driving quantity PE can be obtained by putting in the equation (9) PEI obtained in accordance with the equation (4) and GR obtained in accordance with the equation (2).

Figure 5:
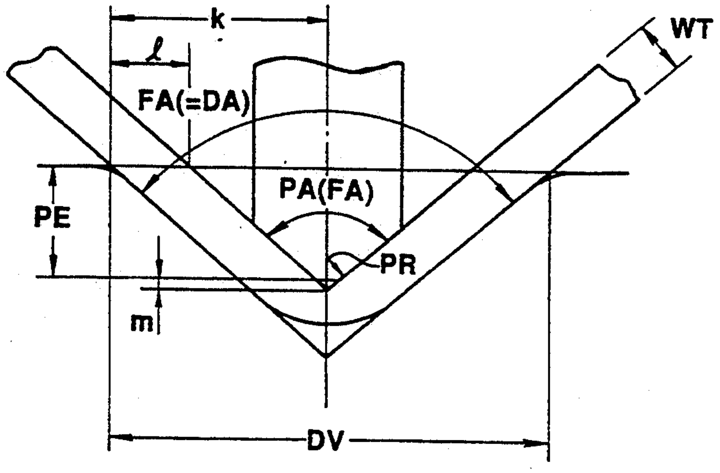
FIG. 5 is an illustrative view which schematically shows a geometrical relationship among the die, the plate and the punch during a coining operation.
Figure 6:
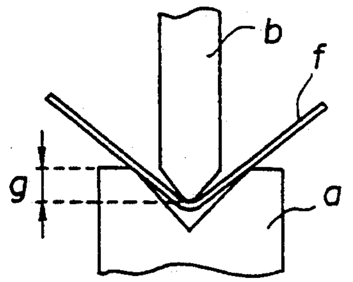

FIG. 5 is an illustrative view which schematically illustrates a geometrical relationship among the die 2, the punch 5 and the plate 4 during a coining operation subsequent to the operation of bending the plate to a V-shaped contour.

In a case of the coining operation, it is supposed that the radius PR of the punch at the foremost end of the latter is substantially equal to the radius FR on the inside of the plate during the bending operation and the angle PA of the foremost end of the punch and the angle DA of the V-shaped recess on the plate are substantially equal to the angle FA of the plate during the bending operation, as shown in the drawing. In addition, it is assumed that the load active on the plate during the bending operation and a configuration of each of the punch and the die are determined such that a configuration of the product to be produced is built as required (wherein the influence attributable to the spring-back has been already included in the die).

Now, the driving quantity PE is expressed by the following equation.

$$PE=(k-l)\times\tan(90^\circ-DA/2)-m \quad (10)$$

wherein k is derived from the following equation $$k=DV/2 \quad (11)$$

l is derived from the following equation and $$l=WT/\sin(90^\circ-DA/2) \quad (12)$$

m is derived from the following equation.

$$m=PR\times(1/\cos(90^\circ-DA/2)-1) \quad (13)$$

Consequently, the driving quantity PE can be obtained by putting the equations (11) to (13) into the equation (10).

Next, a calculation for determining the driving quantity PE, particularly, a calculation for locating the lowermost position of the upper beam 7 will be described below in additional consideration of the mechanical factor as mentioned the above paragraph (2).

Among the mechanical factors, the factors which become a problem particularly during the bending operations are a factor associated with the displacement of the load active on the upper beams and the lower beam and a factor associated with a degree of parallel extension of the upper beam and the lower beam (relating to the crowning quantity). It is hereinafter assumed that the influence attributable to other factors is neglected. To analyze the mechanical factors, the state of deformation of the press brake 1 at respective parts of the latter during the bending operation is illustratively expressed in the form of a model as shown in FIG. 1 in order that the lowermost position of the upper beam 7 is obtained in the following manner in consideration of mechanical deformation of the press brake 1 at the time when a specific load is exerted on the plate 4.

Specifically, it is now assumed that the working conditions in the equation (1), i.e., the thickness WT of the plate, the material MAT of the plate, the angle WA for bending the plate to a product, the spring-back angle SB, the radius FR on the inside of the plate during the bending operation, the radius PR of the foremost end of the punch, the width DV of the V-shaped recess on the die and the radius DR of the die at a shoulder are inputted into the operation panel 11 as input informations in addition to a height PH of the punch and a height DH of the die.

Subsequently, displacement of the load active at respective parts of each of the upper and lower beams, specifically, a quantity DU of deflection of the upper beam (representative of a value at the central part of the press brake), a quantity DL of deflection of the lower beam (representative of a value at the central part of the press brake), displacement EUT of the load (representative of an average value between displacement of the load on the left-hand side and displacement of the load on the right-hand side of the press brake) at support positions of the upper beam (joint portions of the hydraulic cylinders), compressive displacement EL of the lower beam (displacement of the load at the support positions), displacement ES of the load at stopper mounting portions for locating the lowermost position of the upper beam (representative of an average value between displacement of the load on the left-hand side and displacement of the load on the right-hand side) and displacement DC of the load from the stopper mounting portions for locating the lowermost position of the upper beam to the hydraulic cylinder mounting portions (representative of an average value between displacement of the load on the left-hand side and displacement of the load on the right-hand side) are obtained on based on the aforementioned working conditions.

Values representing the aforementioned variables can immediately obtained based on the previously determined experimental equations which could definitely be established under given working conditions by way of a variety of experiments and simulations conducted under the given conditions.

Next, a geometrical relationship relative to the displacement of the load at respective parts on the upper and lower beams will carefully be considered in the following.

In FIG. 1, reference character F designates a lower surface of the upper beam at the time of an unloaded state, reference character G designates an upper surface of the lower beams 3 at the time of the unloaded state, reference character E designates a lower surface of the upper beam 7 at a loaded state, reference character B designates an upper surface of the lower beam 3 at the time of the loaded state in a case where no crowning adjustment is carried out and reference character C designates an upper surface of the lower beam 3 at the time of the loaded state in a case where crowning adjustment has been carried out. In addition, reference characters CW designate a quantity of crowning (representative of a value at the central part of the press brake). Here, it is supposed that the shape of crowning coincides with a composite deflection curve derived from the upper and lower beams and thereby a distance between the upper surface of the lower beam and the lower surface of the upper beam at the central part of the press brake is coincident to a distance between the upper surface of the lower beam and the lower surface of the upper beam at an arbitrary position along the whole length of a plate.

The crowning quantity CW is calculated as an optimum value in accordance with the following equation based on the upper beam deflection quantity DU and the lower beam deflection quantity DL both of which have been derived in the above-described manner.

$$CW=(DU+DL)\times DECW \quad (14)$$

where KECW is a constant wherein it is assumed that an optimum value of the constant KECW has been derived by way of a variety of experiments and simulations.

Now, the driving quantity PE can be obtained by carrying out calculations in accordance with the equations (2) to (9) or the equations (10) to (13), provided that the aforementioned working conditions are previously known. Therefore, as is apparent from FIG. 1, the lowermost positions $D_P$ of the upper beam 7 (i.e., a distance between the upper surface of the lower beam and the lower surface of the upper beam that is hereinafter referred to as a depth value) is represented based on the driving quantity PE, the punch height PH and the die height DH in accordance with the following equations.

$$D_p=PH+DH-PE \quad (15)$$

In practice, however, since the upper beam and the lower beam are deformed as shown in FIG. 1, the depth value during the bending operation becomes $D_P$ but does not become $D_P$ that is a depth value required to guarantee the angle WA for bending the plate to a product. For the reason, to assure that the depth value $D_P$ is finally derived, a depth value $D_{PT}$ having a quantity of deformation included therein is preset as a target value in accordance with the following equation.

$$D_{PT}=D_p=(D_p-D_p) \quad (16)$$

As is apparent from the drawing, the equation (16) is represented in a modified state in accordance with the following equation.

$$D_{PT}=PH+DH-PE-(DU+DL+EUT+EL)+CW \quad (17)$$

where EUT is derived from the following equation.

$$(EUT=ES-DC \quad (18))$$

Consequently, the target depth value which assures that a required angle WA for bending the plate as a product is finally derived in additional consideration of the mechanical deformation of the press brake can be obtained by putting in the equation (17) the load displacements DU, DL, EUT and EL at respective parts on the upper beam and the lower beam which have been derived in the above-described manner.

As is apparent from the above description., as the CPU 10 performs a series of arithmetic processings in the above-described manner, the CPU 10 outputs a crowning quantity setting command signal to the crowing adjustment mechanism 9 for the purpose of displacing the upper surface of the lower beam 3 by the crowning quantity CW which has been calculated in accordance with the equation (14), whereby the upper surface of the lower beam 3 is displaced by the crowning quantity by actuating the crowning adjustment mechanism 9. Subsequently, the CPU 10 outputs a signal to the NC controller 12 in correspondence to the target depth value $D_{PT}$ which has been calculated in accordance with the equation (17). As a result, the servo-mechanisms 8R and 8L for setting the lowermost position of the upper beam 7 are actuated via the motor control section 13 and the servo motors 14R and 14L so as to allow the depth value representative of the lowermost position of the upper beam 7 to finally assume a value of $D_P$. After adjusting of the crowing quantity and setting of the lowermost position of the upper beam 7 are achieved in the above-described manner, the press brake 1 starts its operation. Thus, the plate 4 can be bent to the target bend angle WA with a high accuracy.

The present invention has been described above as to a press brake of which upper beam is displaced upwardly and downwardly. However, the present invention should not be limited only to this. Alternatively, the present invention may equally be applied to a press brake of which lower beam is displaced upwardly and downwardly.

INDUSTRIAL APPLICABILITY

With the apparatus of the present invention as constructed in the above-described manner, the CPU calculates a quantity of crowning to be adjusted based on a quantity of mechanical deformation of the press brake and then automatically carries out crowning adjustment based on values derived from the foregoing calculation. Thus, the apparatus can reliably eliminate a malfunction of so-called intermediate opening without any necessity for trial bending operations. As a result, the apparatus of the present invention can provide a press brake having an excellent operational efficiency. In addition, since a position to be assumed by the movable table is determined in additional consideration of a quantity of crowning to be adjusted, a plate can exactly be bent to a required angle. Therefore, the apparatus of the present invention can provide a press brake having a high working accuracy.

It can be concluded that the apparatus of the present invention is advantageously applied to a press brake for which a high operational efficiency and a high working accuracy are required.

I claim:

1. Apparatus for controlling a press brake (1) for bending a plate (4) to a target bend angle (WA) by pressing the plate between a first die (2) fixedly mounted to a first beam (3) and a second die (5) fixedly mounted to a second beam (7), one of the beams (3, 7) being movable towards the other to press the plate, and one of the beams being adjustable to vary the amount of crowning of that adjustable beam (3 or 7), the apparatus comprising:

crowning adjustment means (9) for adjusting the amount of crowning of the adjustable beam;

calculating means (10) for calculating the position to which the movable beam (3 or 7) should be moved to bend the plate to the target bend angle;

position adjustment means for adjusting the position to which the movable beam should be moved; and drive means (6R, 6L) for driving the movable beam to move to the calculated position;

calculating means for:

calculating displacements (EUT, EL, DC) of the first beam (3) and the second beam (7) under load when the plate is pressed between the dies, and deflections (DU, DL) of the beams (3, 7) when the first die and the second die approach closest to each other, based on a plurality of working conditions for bending the plate including the target bend angle; and calculating an amount of crowning (CW), based on the calculated die placements and deflections;

the amount of crowning of the adjustable beam being adjusted by the crowning adjustment means (9) to the calculated amount of crowning;

the calculation of the position to which the movable beam should be moved is based on the calculated displacements, deflections and amount of crowning; and the adjustment of the position to which the movable beam is moved by said adjustment position means is based on the calculated displacements, deflections and amount of crowning.

2. Apparatus as claimed in claim 1, including inputting means for allowing the plurality of working conditions for bending the plate to be input into the apparatus.

* * * * *